(12) United States Patent
Darrington et al.

(10) Patent No.: US 9,122,736 B2
(45) Date of Patent: Sep. 1, 2015

(54) CALCULATING A THERMAL VALUE TO CONTROL THE FLOW OF LIQUID THROUGH THE LIQUID COOLED HEATSINK WHICH IS IN THERMAL COMMUNICATION WITH THE HIGH POWERED COMPUTING COMPONENT

(71) Applicant: INTERNATIONAL BUSINESS MACHINES CORPORATION, Armonk, NY (US)

(72) Inventors: David L. Darrington, Rochester, MN (US); Adam C. Emerich, Rochester, MN (US); Michael J. Fedor, Rochester, MN (US); Raymond K. Shokes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/739,810

(22) Filed: Jan. 11, 2013

(65) Prior Publication Data
US 2014/0201557 A1 Jul. 17, 2014

(51) Int. Cl.
*G06F 1/00* (2006.01)
*G06F 11/30* (2006.01)
*G06F 1/32* (2006.01)
*G06F 1/26* (2006.01)
*G06F 1/30* (2006.01)

(52) U.S. Cl.
CPC .............. *G06F 11/3058* (2013.01); *G06F 1/26* (2013.01); *G06F 1/30* (2013.01); *G06F 1/3203* (2013.01)

(58) Field of Classification Search
CPC ............ G06F 1/3203; G06F 1/30; G06F 1/26
See application file for complete search history.

(56) References Cited

U.S. PATENT DOCUMENTS

| 6,518,782 | B1 | 2/2003 | Turner | |
|---|---|---|---|---|
| 2002/0191430 | A1* | 12/2002 | Meir | 363/141 |
| 2009/0281761 | A1 | 11/2009 | Bandholz et al. | |
| 2010/0312415 | A1* | 12/2010 | Loucks | 700/300 |
| 2011/0194256 | A1* | 8/2011 | De Rijck et al. | 361/717 |

OTHER PUBLICATIONS

Gwinn et al., "Performance and Testing of Thermal Interface Materials", Thermal Challenges in Next Generation Electronic Systems—Proceedings of the THERMES 2002 Conference, Mar. 2002, pp. 201-210, Millpress, Rotterdam, ISBN 90-77017-03-8.

* cited by examiner

*Primary Examiner* — Jaweed A Abbaszadeh
*Assistant Examiner* — Gayathri Sampath
(74) *Attorney, Agent, or Firm* — Edward J. Lenart; Kennedy Lenart Spraggins LLP

(57) ABSTRACT

Methods, systems, and products are provided for monitoring the temperature of a high powered computing component. The high powered computing component has a thermal sensor and the high powered computing component in thermal communication with a liquid cooled heatsink. Embodiments include determining, by a thermal monitoring module, a temperature of the thermal sensor; determining, by the thermal monitoring module, a temperature of the heatsink; determining, by the thermal monitoring module, a power delivered to the high powered computing component; and calculating, by the thermal monitoring module, a thermal value in dependence upon the temperature of the thermal sensor, the temperature of the heatsink, and the power delivered to the high powered computing component.

11 Claims, 2 Drawing Sheets

CALCULATING A THERMAL VALUE TO CONTROL THE FLOW OF LIQUID THROUGH THE LIQUID COOLED HEATSINK WHICH IS IN THERMAL COMMUNICATION WITH THE HIGH POWERED COMPUTING COMPONENT

BACKGROUND OF THE INVENTION

1. Field of the Invention

The field of the invention is data processing, or, more specifically, methods, systems, and products for monitoring the temperature of a high powered computing component.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

This increase in computing power often results in increased heat which must be administered. This heat is increasingly administered with liquid cooling of high powered computing ('HPC') components. With the increased usage of liquid cooling in HPC components, thermal interfaces on high power devices such as application specific integrated circuits, processors, graphics components and other HPC components are critical to long term reliability. These thermal interfaces are more easily monitored in a water cooled environment where a heatsink (often called a coldplate in these systems) is at a constant or very slowly changing temperature.

SUMMARY OF THE INVENTION

Methods, systems, and products are provided for monitoring the temperature of a high powered computing component. The high powered computing component has a thermal sensor and the high powered computing component in thermal communication with a liquid cooled heatsink. Embodiments include determining, by a thermal monitoring module, a temperature of the thermal sensor; determining, by the thermal monitoring module, a temperature of the heatsink; determining, by the thermal monitoring module, a power delivered to the high powered computing component; and calculating, by the thermal monitoring module, a thermal value in dependence upon the temperature of the thermal sensor, the temperature of the heatsink, and the power delivered to the high powered computing component.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
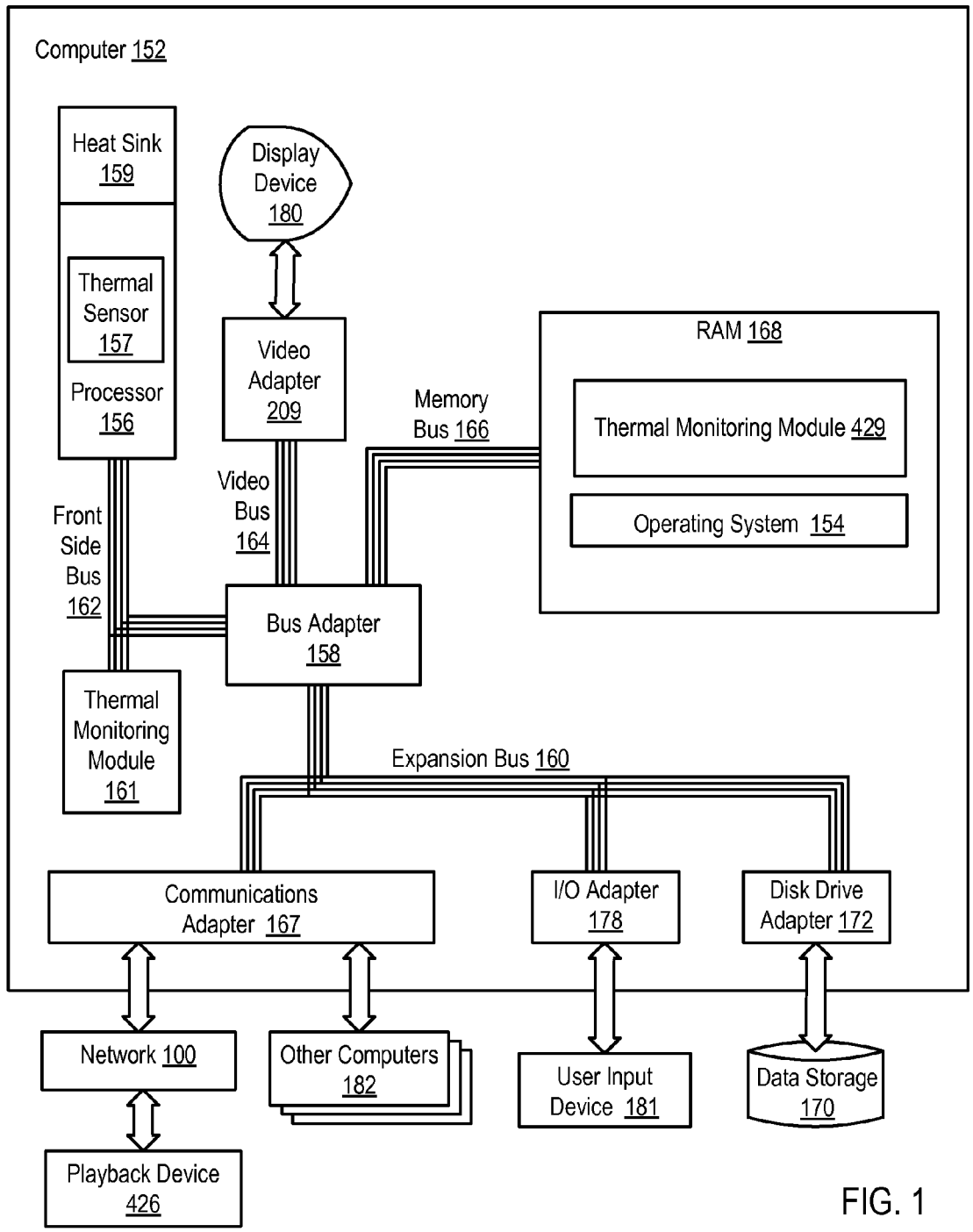
FIG. 1 sets forth a block diagram of automated computing machinery comprising an exemplary computer useful in monitoring the temperature of a high powered computing component according to embodiments of the present invention.

Exemplary methods, systems, and products for monitoring the temperature of a high powered computing component in accordance with the present invention are described with reference to the accompanying drawings, beginning with FIG. 1. FIG. 1 sets forth a block diagram of automated computing machinery comprising an example computer (152) useful in monitoring the temperature of a high powered computing component according to embodiments of the present invention. The computer (152) of FIG. 1 includes at least one high powered computing component, in this example, a computer processor (156) or 'CPU.' Although in the example of FIG. 1, the high powered computing component is a processor, embodiments of the present invention may be used with any number of high powered computing components such as ASICs, graphics processors, graphics accelerators, graphics cards, video adapters, and other high powered computing components that will occur to those of skill in the art.

The processor (156) of FIG. 1 includes a liquid cooled heatsink (159) to reduce the temperature of the processor. Liquid cooling, by use of water for example, is a highly effective method of removing excess heat from high powered components. The advantages of using water cooling over air cooling include water's higher specific heat capacity, density, and thermal conductivity. The principle used in cooling computers is similar to that used in an automobile's internal combustion engine, with the water being circulated by a water pump through a block mounted on the CPU and out to a heat exchanger, typically a radiator. Fluids have the ability to dissipate more heat from the parts being cooled than the various types of metals used in heatsinks, making it suitable for overclocking and high powered computing components.

Advantages of liquid cooling include the fact that a system is not limited to cooling one component, but can be set up to cool the central processing unit, graphics processing unit, and/or other high powered components at the same time with the same system. As opposed to air cooling, liquid cooling is also influenced less by the ambient temperature. Liquid cooling's comparatively low noise-level compares favorably to that of active cooling, which can become quite noisy.

The processor (156) of FIG. 1 also includes a thermal sensor (157) that senses the temperature of the processor (156). Examples of thermal sensors include thermal diodes, thermistors, and other thermal sensors that will occur to those of skill in the art. Thermal diodes operate on the principle that voltage changes across the diode linearly according to temperature. As the temperature increases, diodes forward voltage decreases. Thermal diodes are usually placed in that part of the processor core where highest temperature is encountered. Voltage developed across the thermal diode varies with the temperature of the diode. Silicon thermal diodes have temperature dependency of −2 mV per degree Celsius. Thus, the junction temperature can be determined by passing a current through the diode and then measuring voltage developed across it. A thermistor is a type of resistor whose resistance varies significantly with temperature, more so than in standard resistors. The word is a portmanteau of thermal and resistor. Thermistors are widely used as temperature sensors.

The example computer (152) of FIG. 1 also includes random access memory (168) ('RAM') which is connected through a high speed memory bus (166) and bus adapter (158) to the processor (156) and to other components of the computer (152). Stored in RAM (168) is a thermal monitoring module (429) a module of computer program instructions for monitoring the temperature of a high powered computing component. The thermal monitoring module (429) includes computer program instructions that when executed cause the computer to carry out the steps of determining a temperature of the thermal sensor; determining a temperature of the heatsink; determining a power delivered to the high powered computing component; and calculating a thermal value in dependence upon the temperature of the thermal sensor, the temperature of the heatsink, and the power delivered to the high powered computing component.

The thermal monitoring module (429) also includes computer program instructions that monitor the thermal value and if the thermal value is increasing notify a system administrator. The system administrator may be so notified by an automated message identifying the component whose temperature is rising, sounding an alarm or other notification or in other ways as will occur to those of skill in the art. The thermal monitoring module (429) may also include computer program instructions that monitor the thermal value and if the thermal value is increasing reduce the temperature of the heatsink. The temperature of the heatsink may be reduced by reducing the temperature of the liquid in the heatsink, increasing the rate at which pumps move the water through the heatsink, and in other ways as will occur to those of skill in the art.

Also stored in RAM (168) is an operating system (154). Operating systems useful monitoring the temperature of a high powered computing component according to embodiments of the present invention include UNIX™, Linux™, Microsoft XP™, AIX™, IBM's i5/OS™, and others as will occur to those of skill in the art. The operating system (154), and thermal monitoring module (429) in the example of FIG. 1 are shown in RAM (168), but many components of such software typically are stored in non-volatile memory also, such as, for example, on a disk drive (170).

Also depicted in the example of FIG. 1 is a thermal monitoring module (161) implemented in hardware as an alternative to the thermal monitoring module (429) implemented in software. The thermal monitoring module (161) may be implemented as a circuit, a field programmable gate array, or other hardware to monitor the temperature of a high powered computing component by determining a temperature of the thermal sensor; determining a temperature of the heatsink; determining a power delivered to the high powered computing component; and calculating a thermal value in dependence upon the temperature of the thermal sensor, the temperature of the heatsink, and the power delivered to the high powered computing component.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for monitoring the temperature of a high powered computing component according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for monitoring the temperature of a high powered computing component according to embodiments of the present invention include modems for wired dial-up communications, Ethernet (IEEE 802.3) adapters for wired data communications network communications, and 802.11 adapters for wireless data communications network communications.

Figure 2:
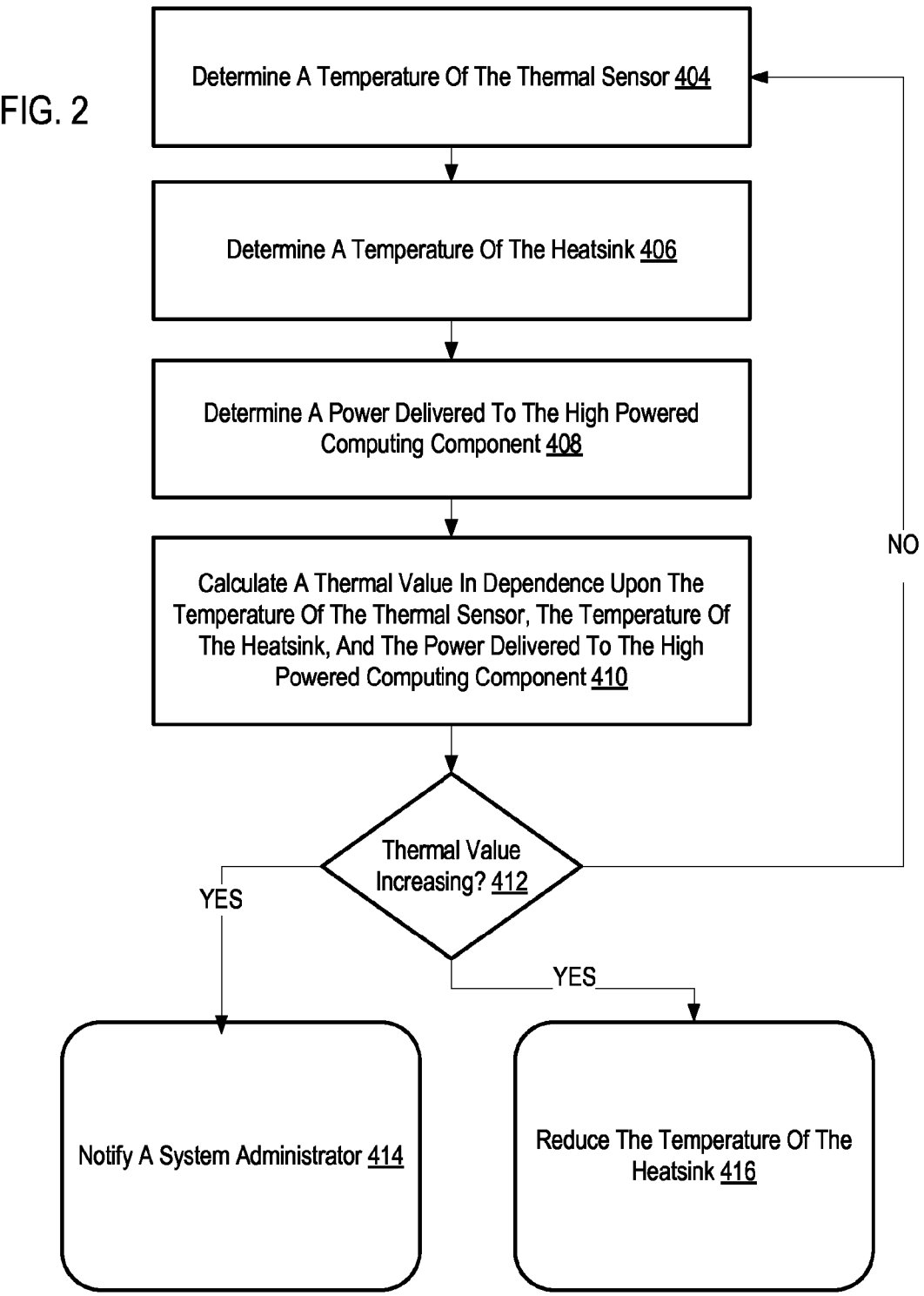
FIG. 2 sets forth a flow chart illustrating an exemplary method for monitoring the temperature of a high powered computing component according to embodiments of the present invention.

For further explanation, FIG. 2 sets forth a flow chart illustrating an exemplary method for monitoring the temperature of a high powered computing component according to embodiments of the present invention. In the example of FIG. 2, the high powered computing component has a thermal sensor and the high powered computing component is in thermal communication with a liquid cooled heatsink The high powered computing component may be a processor, a ASIC, a graphics processor, a graphics accelerator, a graphics card, a video adapter, or other high powered computing component that will occur to those of skill in the art. A thermal sensor according to embodiments of the present invention may be thermal diode, a thermistor, or any other thermal sensor that will occur to those of skill in the art.

The method of FIG. 2 includes determining (404), by a thermal monitoring module, a temperature of the thermal sensor. Determining (404), by a thermal monitoring module, a temperature of the thermal sensor may be carried out by receiving a temperature value from of a thermal diode, a thermistor, or other thermal sensor.

The method of FIG. 2 also includes determining (406), by the thermal monitoring module, a temperature of the heatsink. Determining (406), by the thermal monitoring module, a temperature of the heatsink may be carried out by receiving a temperature value from a temperature sensor associated with the heatsink.

The method of FIG. 2 also includes determining (408), by the thermal monitoring module, a power delivered to the high powered computing component. Determining (408), by the thermal monitoring module, a power delivered to the high powered computing component may be carried out by calculating the power delivered to the high powered computing component. For a processor, for example, calculating the power delivered to the processor my include calculating an average power dissipated by the processor while running a collection of benchmark instructions on the processor.

The method of FIG. 2 also includes calculating (410), by the thermal monitoring module, a thermal value in dependence upon the temperature of the thermal sensor, the temperature of the heatsink, and the power delivered to the high powered computing component. In some embodiments, the thermal value is a thermal resistance. Calculating a thermal value in dependence upon the temperature of the thermal sensor, the temperature of the heatsink, and the power delivered to the high powered computing component may be carried out according to the following formula:

$$R_{th} = (T_j - C_{plate})/P, \text{ wherein:}$$

$R_{th}$ is the thermal value;

$T_j$ is the temperature of the thermal sensor such as, for example, the junction temperature of the high powered component;

$C_{plate}$ is the temperature of the heatsink; and

P is the power delivered to the high powered computing component.

The method of FIG. 2 also includes determining (412), by the thermal monitoring module, that the thermal value is increasing. Determining (412), by the thermal monitoring module, that the thermal value is increasing may be carried out by periodically calculating the thermal value and comparing the current thermal value with one or more past thermal values.

The method of FIG. 2 includes, in one embodiment, notifying (414), by the thermal monitoring module, a system administrator if the thermal value is increasing. Notifying (414), by the thermal monitoring module, a system administrator may be carried out by triggering an alarm, sending the system administrator a message, or any other method of notifying a system administrator that will occur to those of skill in the art.

The method of FIG. 2 includes, in another alternative embodiment, reducing (416), by the thermal monitoring module, the temperature of the heatsink if the thermal value is increasing. Reducing the temperature of the heatsink may be carried out by increasing the flow of liquid in the heatsink by the pumps, reducing the temperature of the liquid in the heatsink, or any other method of reducing the temperature of the heatsink that will occur to those of skill in the art.

Exemplary embodiments of the present invention are described largely in the context of a fully functional computer system for monitoring the temperature of a high powered computing component. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for monitoring the temperature of a high powered computing component, the high powered computing component having a thermal sensor and the high powered computing component in thermal communication with a liquid cooled heatsink, the system comprising a computer processor, a computer memory operatively coupled to the computer processor, the computer memory having disposed within it computer program instructions that, when executed by the computer processor, cause the apparatus to carry out the steps of:

determining, by a thermal monitoring module via a temperature of the thermal sensor, a temperature of the high powered computing component;
 determining, by the thermal monitoring module, a temperature of the liquid cooled heatsink;
 determining, by the thermal monitoring module, a power delivered to the high powered computing component;
 calculating, by the thermal monitoring module, a thermal value in dependence upon the temperature of the high powered computing component, the temperature of the liquid cooled heatsink, and the power delivered to the high powered computing component;
 determining, by the thermal monitoring module, that the thermal value is increasing; and
 responsive to determining that the thermal value is increasing, increasing the flow of liquid through the liquid cooled heatsink.

2. The system of claim 1 wherein the computer memory has disposed within it computer program instructions that, when executed by the computer processor, cause the apparatus to carry out the steps of:

determining, by the thermal monitoring module, that the thermal value is increasing; and
 notifying, by the thermal monitoring module, a system administrator.

3. The system of claim 1 wherein the thermal value is a thermal resistance.

4. The system of claim 1 wherein calculating a thermal value in dependence upon the temperature of the high powered computing component, the temperature of the liquid cooled heatsink, and the power delivered to the high powered computing component is carried out according to the formula:

$$R_{th}=(T_j-C_{plate})/P, \text{ wherein:}$$

$R_{th}$ is the thermal value;
$T_j$ is the temperature of the high powered computing component;
$C_{plate}$ is the temperature of the liquid cooled heatsink; and
P is the power delivered to the high powered computing component.

5. The system of claim 1 wherein the high powered computing component is a processor.

6. The system of claim 1 wherein the temperature sensor is a thermal diode.

7. A computer program product for monitoring the temperature of a high powered computing component, the high powered computing component having a thermal sensor and the high powered computing component in thermal communication with a liquid cooled heatsink, the computer program product disposed upon a computer readable medium, wherein the computer readable medium is not a signal, the computer program product comprising computer program instructions that, when executed, cause a computer to carry out the steps of:

determining, by a thermal monitoring module via a temperature of the thermal sensor, a temperature of the high powered computing component;
 determining, by the thermal monitoring module, a temperature of the liquid cooled heatsink;
 determining, by the thermal monitoring module, a power delivered to the high powered computing component;

calculating, by the thermal monitoring module, a thermal value in dependence upon the temperature of the high powered computing component, the temperature of the liquid cooled heatsink, and the power delivered to the high powered computing component;

determining, by the thermal monitoring module, that the thermal value is increasing; and responsive to determining that the thermal value is increasing, increasing the flow of liquid through the liquid cooled heatsink.

8. The computer program product of claim 7 further comprising computer program instructions that, when executed, cause a computer to carry out the steps of:

determining, by the thermal monitoring module, that the thermal value is increasing; and notifying, by the thermal monitoring module, a system administrator.

9. The computer program product of claim 7 wherein the thermal value is a thermal resistance.

10. The computer program product of claim 7 wherein calculating a thermal value in dependence upon the temperature of the high powered computing component, the temperature of the liquid cooled heatsink, and the power delivered to the high powered computing component is carried out according to the formula:

$$R_{th} = (T_j - C_{plate})/P, \text{ wherein:}$$

$R_{th}$ is the thermal value;

$T_j$ is the temperature of the high powered computing component;

$C_{plate}$ is the temperature of the liquid cooled heatsink; and

P is the power delivered to the high powered computing component.

11. The computer program product of claim 7 wherein the high powered computing component is a processor.

* * * * *